No. 719,954. PATENTED FEB. 3, 1903.
A. R. PATTEN.
CLUTCH.
APPLICATION FILED OCT. 14, 1901.
NO MODEL.

Witnesses:
Oscar F. Hill
A. F. Randall

Inventor:
Alonzo R. Patten
By Macleod Calver & Randall
Attorneys.

UNITED STATES PATENT OFFICE.

ALONZO R. PATTEN, OF AUBURN, RHODE ISLAND, ASSIGNOR, BY MESNE ASSIGNMENTS, TO CROMPTON & KNOWLES LOOM WORKS, OF WORCESTER, MASSACHUSETTS, A CORPORATION OF MASSACHUSETTS.

CLUTCH.

SPECIFICATION forming part of Letters Patent No. 719,954, dated February 3, 1903.

Application filed October 14, 1901. Serial No. 78,534. (No model.)

*To all whom it may concern:*

Be it known that I, ALONZO R. PATTEN, a citizen of the United States, residing at Auburn, in the county of Providence, State of Rhode Island, have invented a certain new and useful Improvement in Clutches, of which the following is a specification, reference being had therein to the accompanying drawings.

The main objects of the invention are to produce a new and improved clutch which shall be adapted for general use on looms and other machinery, and more especially to produce a clutch which shall operate without tendency to press endwise in its bearings the shaft to which the clutch is applied in practice. This tendency in the case of preëxisting arrangements of clutch mechanism has the disadvantage of causing the shaft to run hard and produces wear.

The invention consists in clutch mechanism of the character which I will now proceed to describe, with reference to the accompanying drawings, in which latter I have illustrated an embodiment of the invention in its best or preferred form.

Figure 1:
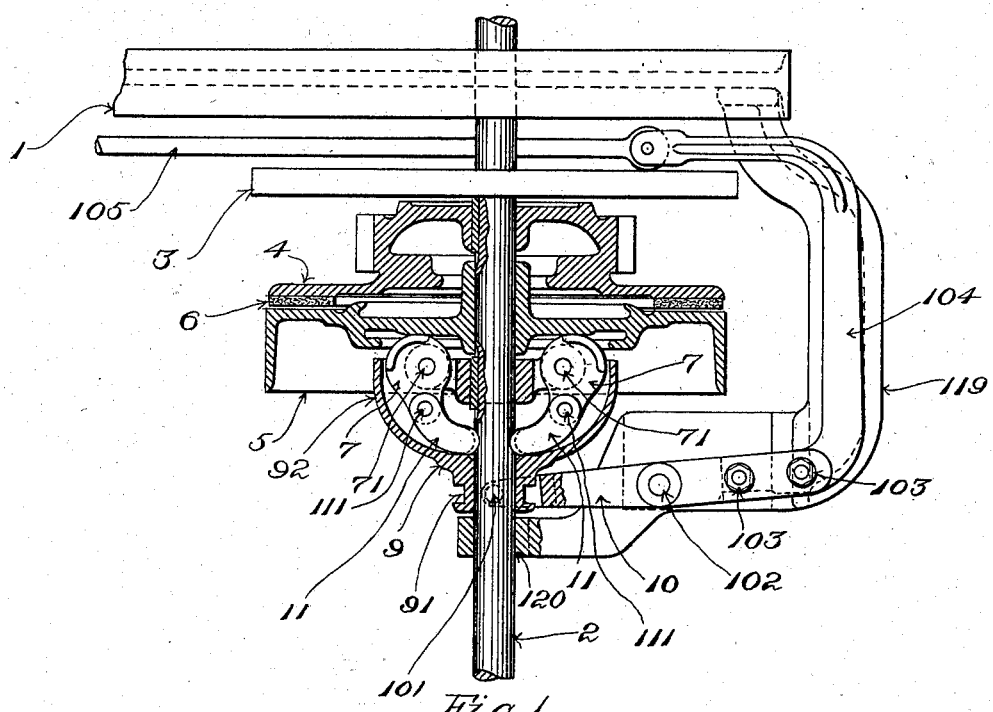
Figure 2:
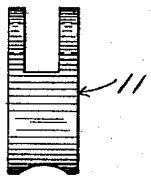

In the drawings, Figure 1 shows in plan, partly in horizontal section, the said embodiment of the invention. Fig. 2 shows in detail one of the struts.

Having reference to the drawings, 1 designates part of the framing of a machine in connection with which my improved clutch mechanism is supposed to be employed, and 2 is a rotating shaft, which is mounted in suitable bearings (not necessary to be shown) in the said frame. 3 is a fly-wheel on the said shaft.

The invention is represented as embodied in a friction-clutch, the main elements of which comprise the clutch member 4, which is fast with the shaft 2, and the clutch member 5, which is mounted on shaft 2 with capacity to turn thereon and also to move lengthwise of the shaft.

6 is a frictional surfacing of usual character interposed between the proximate faces of the clutch members 4 and 5 and fastened to one of the latter. Clutch member 5 is shown formed as a band-pulley suitable to receive or transmit power through the application of a driving-band thereto.

The features thus far described are not in themselves of the gist of the invention, and it will be understood that the character and construction of the clutch members *per se* may vary in practice.

For the purpose of occasioning driving interengagement of the coacting clutch members I provide rockers or cams 7 7. A leading characteristic of these rockers or cams is the fact that they are arranged and operate to press the relatively movable clutch member lengthwise of the shaft 2, whereby to close the clutch. Preferably they are mounted to swing transversely with respect to the clutch members—that is to say, in a direction extending lengthwise of shaft 2—and their acting faces make contact with the disk of the relatively movable clutch member. The said rockers or cams are supported pivotally upon a collar 8, fast upon the shaft 2. They are shown connected with lugs extending radially outward from the said collar by means of pins or journals 71 71, Fig. 1. For the purpose of actuating the rockers or cams 7 7 I provide a collar 9, which is mounted upon the shaft 2 with capacity to move lengthwise of the shaft, the said collar being grooved exteriorly at 91 and receiving in the groove the pins 101, which are carried by the fork of a shipper 10, the latter being represented as a lever pivoted at 102 upon a horizontal stand or bracket 119, extending outward from the fixed frame 1 and provided with a bearing 120, fitting shaft 2 adjacent to collar 9. In connection with the said cams and the collar 9 I employ means operating in the lateral movement of the said collar, which is occasioned at will through the instrumentality of the shipper 10 aforesaid to actuate the cams and by rocking the latter compress or close the clutch members together. Preferably the said means comprises, essentially, struts 11 11, engaging by their outer portions with the cams 7 7, the said struts interposing between the tails of said cams and the shaft 2. The connection between the struts and the cams is pivotal, as by means of pivots or journals 111 111, Fig. 1. The struts converge inwardly from the points of their engagement with cams 7 7 toward shaft 2, and their inner portions are in sliding contact with the periphery of the said shaft. The said struts are in the form of blocks, which are slightly concaved or hollowed to fit the shaft, as at 112, Fig. 2. When collar 9 is operated through shipper 10, and thereby pressed against the struts 11 11, it forces the inner ends of these latter lengthwise of the shaft, which constitutes an abutment along which said inner ends slide. As the struts are thus acted upon their resulting change of inclination with relation to the shaft causes their points of engagement with cams 7 7 to be forced away from the axis of the shaft, thereby rocking the cams 7 7 and causing their acting portions to force the clutch members together. When the pressure of collar 9 is relaxed, the cams and struts become free to move reversely, which affords opportunity for the clutch members to operate. The contact between the face of the disk of clutch member 5 and the acting faces of cams 7 7 takes place at points radially beyond the axes of the pivots or journals 71 71 of said cams, which prevents the clutch from becoming locked in its closed position. For the purpose of protecting the cams and struts from injury and of excluding dust, &c., from the working parts the collar 9 is sometimes formed with a cup-shaped flange 92, inclosing the cams and struts and extending into close proximity to the disk of clutch member 5.

The rear arm of the lever constituting the shipper 10 is shown as having fastened thereto by bolts at 103 103 an extension 104, which is U-shaped in order to clear the clutch members 4 and 5 and fly-wheel 3 and has pivotally connected to its free extremity an operating-rod 105.

I claim as my invention—

The combination, with the shaft, of the improved clutch comprising, essentially, coacting clutch members, the cams mounted to rock transversely with relation to said clutch members, the swiveling struts engaging with said cams and interposing between the same and the said shaft, the movable collar to force said struts laterally and cause them to rock said cams, to thereby cause the latter to compress the clutch members together, and the shipper to move said collar, substantially as described.

In testimony whereof I affix my signature in presence of two witnesses.

ALONZO R. PATTEN.

Witnesses:
E. W. DAVENPORT,
E. NISBET.